United States Patent

Scharnowski et al.

[11] Patent Number: 5,918,856
[45] Date of Patent: Jul. 6, 1999

[54] ELECTROPNEUMATIC VALVE

[75] Inventors: Gerhard Scharnowski, Gehrden; Huu-Tri Nguyen, Lehrte; Ralf Kook; Reinhard Mauentöbben, both of Hannover, all of Germany

[73] Assignee: Mannesmann Aktiengesellschaft, Düsseldorf, Germany

[21] Appl. No.: 08/968,282

[22] Filed: Nov. 12, 1997

[30] Foreign Application Priority Data

Dec. 6, 1996 [DE] Germany .......................... 196 52 410

[51] Int. Cl.$^6$ .................................................. F16K 31/06
[52] U.S. Cl. .................. 251/129.15; 251/129.07
[58] Field of Search .............. 251/129.15, 129.01, 251/129.07

[56] References Cited

U.S. PATENT DOCUMENTS

| | | | |
|---|---|---|---|
| 2,829,319 | 4/1958 | McCleskey | 251/129.15 X |
| 4,074,700 | 2/1978 | Engle | 251/129.15 X |
| 4,848,725 | 7/1989 | Tibbals, Jr. | 251/129.07 X |
| 5,497,975 | 3/1996 | Achmad | 251/129.07 |
| 5,575,309 | 11/1996 | Connell | 251/129.15 X |
| 5,701,874 | 12/1997 | Sari et al. | 251/129.07 X |

FOREIGN PATENT DOCUMENTS 30 37 172  4/1981  Germany .

OTHER PUBLICATIONS

Article entitled "Knowhow in Pneumatik" dated Nov. 1993 printed in Sweden by Tofters Trycheri AB, taken from "Mannesmann Rexroth, Rexroth Mecman Pneumatik" four pp.

Primary Examiner—Kevin Lee
Attorney, Agent, or Firm—Cohen, Pontani, Lieberman & Pavane

[57] ABSTRACT

An electropneumatic valve including a valve body and a proportional magnet connected thereto and having a unitary tappet having an integral valve disk disposed at one end and an armature of the proportional magnet disposed at an end longitudinally opposite thereto. The tappet and valve disk being formed of a nonmagnetic material and the valve body and proportional magnet are contactingly connected by complementary interlocking features.

3 Claims, 1 Drawing Sheet

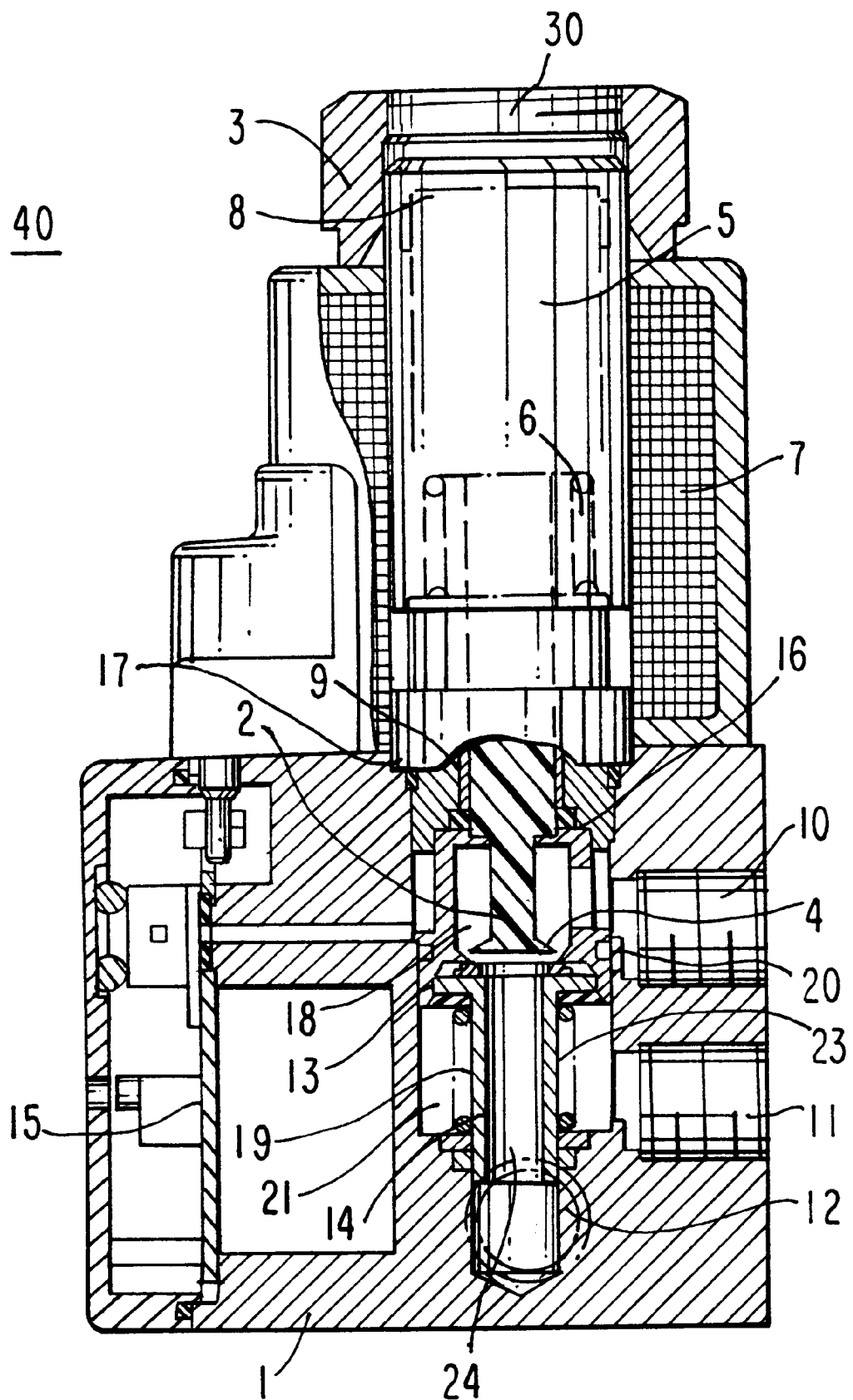

ELECTROPNEUMATIC VALVE

BACKGROUND OF THE INVENTION

1. Field of the Invention

The present invention is directed to an electropneumatic valve and more particularly, to an electropneumatic valve having a nonmagnetic unitary tappet with an integral valve disk.

2. Description of the Related Art

A pressure regulating valve disclosed at page 7.026 of a product catalog from Mannesmann Rexroth Pneumatik GmbH titled "Knowhow in Pneumatik" (Order No. 10/93) is constructed as a 3/3-way directional control seat valve having a proportional magnet drive. The valve part of this electropneumatic valve substantially comprises a valve body including connections for a compressed medium, electric signal lines, and a power supply. In the interior of the valve body, a valve part tappet with a valve disk interacts with a valve seat to ensure operation of the valve.

A proportional magnet is fastened to the valve part and comprises an electric coil and an armature having a tappet connected thereto—the armature and tappet being longitudinally movable and guidable within the coil. The armature is held in an initial position by a spring. The armature tappet transmits the force generated by the electric coil to the valve part via the valve part tappet. To actuate the valve part, the armature tappet impacts on the valve part tappet, this valve tappet likewise being guided along its movement direction.

The separate tappets are normally arranged in contactingly abutting alignment with one another. This contacting relationship between the tappets is necessary to prevent the armature tappet and the valve part tappet from striking one another abruptly when the valve device is switched on. Contact between the tappets is maintained by means of an additional spring inside the valve part that presses the valve part tappet against the armature tappet. The force generated by the coil for actuating the valve must accordingly overcome the force of the spring in the proportional magnet as well as the force of the spring in the valve body.

This disadvantageously effects and impairs the efficiency of the proportional magnet. The required spring force at the valve tappet reduces the available tappet force of the proportional magnet unit and accordingly also reduces the switching dynamics of the pressure regulating valve.

SUMMARY OF THE INVENTION

The present invention provides a novel and unobvious electropneumatic valve that overcomes the above-mentioned shortcomings of the prior art. The inventive valve improves the dynamic switching operation and reduces the quantity and complexity of the component parts that comprise such valves.

The electropneumatic valve of the present invention includes a unitary tappet b having an integral valve disk disposed at one end and an armature of a proportional magnet disposed at an end longitudinally opposite thereto. In a preferred embodiment, at least the tappet and the valve disk are formed of a nonmagnetic material and the valve body and proportional magnet are contactingly connected by complementary interlocking features.

The unitary tappet is guided in the coil of the proportional magnet exclusively by a guiding means of the armature and thus eliminates the need to separately guide the tappet in the valve body, as in prior art valves. In addition, the interlocking fit between the proportional magnet and valve body guarantees an exact positioning of these parts relative to one another and, to this extent, ensures reliable operation of the valve. In addition, a biasing or restoring spring that maintains the tappet in a predefined position is no longer necessary. Thus, the component parts required to construct an electropneumatic valve in accordance with the present invention are significantly reduced as is the time necessary to assemble such a device.

In the unitarily formed tappet, including the valve disk and armature, the transmission of force between the proportional magnet and the valve disk is optimized and the sometimes uncontrolled and undesirable contact that may occur between separate tappets, i.e. an armature tappet and a valve part tappet, is eliminated. Consequently, the switching dynamics of electropneumatic valves configured in accordance with the present invention is greatly improved.

When proportional magnets are used to actuate the valve part, the tappet and the valve disk are preferably produced from nonmagnetic material to eliminate magnetization of these parts, since metallic or magnetic particles which may be present within the valve would otherwise deposit on the tappet and cause premature wear of the moving parts and impair the precise fit between the various valve components. Alternatively, only the tappet or only the valve disk may be produced from nonmagnetic material so as to prevent the magnetism of the armature from propagating to the valve disk.

It is further possible to construct the valve disk at the end of the tappet as a separate, selectively detachable structural component part. This detachable connection is preferably constructed as a screw connection. It is thereby possible to remove and replace a worn valve disk simply and economically and without having to exchange the entire tappet and valve disk assembly. The exchangeable valve disk is advantageously made from a nonmetallic material such as, for example, a plastic, which can be molded to form a rigid body. Sealing of the valve disk is achieved via an elastic seal—rather than by the valve disk—which is arranged at a valve sleeve provided as part of a valve seat and located opposite to the valve disk.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

In the drawing:

FIG. 1 depicts a partial cross-sectional view of a 3/3-way directional electropneumatic valve having a unitary tappet and configured in accordance with the present invention.

DETAILED DESCRIPTION OF THE PRESENTLY PREFERRED EMBODIMENTS

The present invention provides an electropneumatic valve having a valve disk disposed at one end of a unitary tappet and an armature of a proportional magnet disposed at an end of the tappet longitudinally opposite the valve disk. The inventive valve includes a valve body which is sized and shaped to interlockingly and contactingly connect to the proportional magnet. The valve disk is selectively engagable with an elastic seal provided on a valve seat to control the flow of fluid through the inventive valve.

Referring next to the drawing, FIG. 1 depicts an electropneumatic valve configured in accordance with the present invention and generally designated at 40. The valve 40 includes a valve body 1 which is preferably constructed as a 3/3-way directional control seat valve having apertures configured for a work line connection 10 (an A-connection), a compressed air supply connection 11 (a P-connection), and a venting line connection 12 (an R-connection). A drive unit for the valve 40 is preferably configured as a proportional magnet 3 which is connected to the valve body 1 in interlocking fashion. The magnet 3 includes a hollow-cylindrical coil 7 and an armature 5 that is longitudinally movable as a coil core along guides 8 disposed longitudinally within the coil 7.

A unitary tappet 2 adjoins and is coaxially connected to the armature 5. Guides 9 extending coaxially with the armature 5 may be provided to guide the tappet 2 and to ensure substantially linear movement of the tappet 2. However, the guides 9 can be omitted given a sufficiently precise construction of the guides 8 of the armature 5, since the armature 5 and tappet 2 are fixedly connected. A valve disk 4 is connected to an end of the tappet 2 longitudinally remote from the armature 5 and is preferably removably affixed to the tappet 2 and made from a nonmagnetic material such as, for example, a plastic. The tappet 2 is also preferably made of a nonmagnetic material such as, for example, a plastic.

A recess 17 is defined in the valve body 1 and is configured to accept a complementarily sized and shaped part of the magnet 3 so that the magnet 3 and valve body 1 may be firmly engaged and aligned in a predetermined orientation, i.e. to ensure and secure the axial alignment tappet 2. A valve seat 23 comprised of a valve seat sleeve 14 and an annular seal 13 disposed about an upper edge of the sleeve 14 is provided in the valve body 1. The annular seal 13 is preferably vulcanized on an end face of the valve seat sleeve 14 facing the valve disk 4 and is normally biased by a spring 19 to contact an annular seat 20 defined in the valve body 1. The annular seal 13 may be caused to move away from its normal position, i.e. in contacting engagement with the annular seat 20, by the valve disk 4 as described in further detail hereinbelow. The unitarilly formed tappet 2 may be positioned initially in generally spaced apart relation to the annular seal 13, i.e. in an initial position.

The valve seat 23 and valve disk 4 are preferably constructed so as to realize the preferred 3/3-way directional control valve function of the inventive electropneumatic valve 40. For example, the valve disk 4 may be caused to act against the annular seal 13 to provide a precise fit therebetween. Further description of the operational relationship between the valve seat 23 and valve disk 4 are provided hereinbelow. It is thus possible to precisely control the flow of fluid through the inventive electropneumatic valve 40 by selective and controlled movement of the valve disk 4 into and out of engagement with the annular seal 13 of the valve seat 23.

The valve disk 4 and a section of the tappet 2 are disposed in an upper valve cavity 18 defined in an upper portion of the valve body 1. The upper valve cavity 18 is fluidly connected between the work line connection 10 and a channel 24 defined in the valve seat 23—the channel 24 also being fluidly connected to the venting line connection 12. A fluid channel is thus defined through the valve 40 by the work line connection 10, upper valve cavity 18, valve seat channel 24, and venting line connection 12. A lower valve cavity 21 is defined in a lower portion of the valve body 1 and is fluidly connected to the compressed air supply connection 11.

When the magnet 3 is unenergized, i.e. when there is no electrical current flowing therethrough, the tappet 2 is held in a first position by a biasing spring 6—the first position being generally characterized by a the spaced apart relation between the valve disk 4 and annular seal 13. When in the first position, the valve disk 4 is disposed in the interior of the valve part 1. A dynamic seal 16 is provided for the tappet 2 in the valve body 1 and seals the pressure therein against the effects of variations in atmospheric pressure.

The inventive valve is a so-called 3/3-way directional control seat valve which means the valve is operable in three separate and distinct modes or states: ventilation, neutral and aeration. In the ventilation mode, the valve disk 4 does not contact the seal 13 on the valve seat sleeve 14 and thus a gap exists between the seal 13, i.e. valve seat sleeve 14, and the valve disk 4. Accordingly, a compressed fluid or medium can flow from the work line connection 10 into the upper valve space 18, through the channel 24 in the valve seat 23, and out through the venting line connection 12. In the neutral mode, the valve disk 4 contacts the annular seal 13 of the valve seat sleeve 14 and thus prevents the flow of fluid through the valve 40. In the aeration mode, the valve disk 4 contacts the annular seal 13 with sufficient motive force to overcome the biasing force of the spring 19 and causes the seal 13 to move away from the annular seat 20. A gap is thus formed between the seat 20 and the annular seal 13 and the upper and lower valve cavities 18, 21 are fluidly connected. The compressed medium or fluid can flow through the valve 40 proceeding generally from the compressed air supply connection 11 through the lower cavity 21 of the valve body 1, into the upper cavity 18 and, finally, into a working line (not shown) via the working line connection 10.

In order to achieve a pressure-balanced actuation of the inventive valve 40, the diameter of the valve disk 4 is advantageously approximately equal to the diameter of the opening in the valve body 1 through which the tappet extends into the upper cavity 18 of the valve body 1 and corresponds approximately to the diameter of a dynamic seal 16 and to the diameter of the annular seat 20.

The inventive electropneumatic valve 40 may be advantageously used as a pressure regulating valve in that a definable pressure is adjustable by means of comparing actual pressure values experienced within the valve 40 with reference pressure values. Integrated control electronics 15 may carry out the comparison between the reference values and the actual pressure valves, e.g. the pressure in the working line, which can be measured as an actual value, for example, via a piezoresistive pressure sensor (not shown). The control electronics 15 generate a variable control signal which controls the valve 40 via a clocked voltage-to-current converter and via the magnet 3, so that the prescribed pressure is achieved.

The unitary nonmagnetic rigid tappet 2 of the present invention thus provides a component-saving arrangement of a valve actuating mechanism which improves the switching dynamics of the valve. Excellent switching dynamics are particularly desirable for pressure regulating valves so that any regulating deviations can be corrected as quickly as possible.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve substantially the same results are within the scope of the invention. Et is the intention, therefore, to be limited only as indicated by the scope of the claims appended hereto.

We claim:

1. An electropneumatic valve comprising:

a valve body having a longitudinal axis;

a proportional magnet connected to said valve body, said magnet having an armature;

a nonmagnetic tappet having a first end connected to said armature and a second end longitudinally opposite thereto, said tappet being movable along said longitudinal axis through an opening in said valve body;

a nonmagnetic valve disk provided integrally at said second end of said tappet;

a dynamic seal having a sealing diameter and operatively disposed in said valve body between said tappet and said opening in said valve body for sealing a pressure in said valve body against the effects of an atmospheric pressure; and an annular seat mounted in said valve body for receiving said valve disk, wherein each said valve disk, said annular seat, and said opening in said valve body comprises a diameter substantially equal to said sealing diameter of said dynamic seal, thereby allowing a pressure-balanced actuation of said electropneumatic valve.

2. The electropneumatic valve of claim 1, wherein said tappet and said valve disk are formed of plastic.

3. The electropneumatic valve of claim 1, wherein said valve body has a recess defined therein, wherein a portion of said proportional magnet is complementarily sized and shaped with said recess, said recess of said valve body and said complementary portion of said proportional magnet contactingly engaging one another.

* * * * *